United States Patent
Persson

(10) Patent No.: US 10,119,725 B2
(45) Date of Patent: Nov. 6, 2018

(54) HEATER MOUNTING SYSTEM

(75) Inventor: Robert E. Persson, Wakefield, RI (US)

(73) Assignee: Modine Manufacturing Company, Racine, WI (US)

( * ) Notice: Subject to any disclaimer, the term of this patent is extended or adjusted under 35 U.S.C. 154(b) by 2025 days.

(21) Appl. No.: 13/248,177

(22) Filed: Sep. 29, 2011

(65) Prior Publication Data

US 2012/0264076 A1    Oct. 18, 2012

Related U.S. Application Data

(60) Provisional application No. 61/476,636, filed on Apr. 18, 2011.

(51) Int. Cl.
| | | |
|---|---|---|
| *F24J 3/00* | (2006.01) | |
| *F24H 9/06* | (2006.01) | |
| *F24H 3/00* | (2006.01) | |
| *F24D 5/00* | (2006.01) | |

(52) U.S. Cl.
CPC ............... *F24H 9/06* (2013.01); *F24D 5/00* (2013.01); *F24H 3/00* (2013.01)

(58) Field of Classification Search
CPC ................................................... F24H 3/0411
USPC ........................................................ 432/227
See application file for complete search history.

(56) References Cited

U.S. PATENT DOCUMENTS

| | | | | | |
|---|---|---|---|---|---|
| 1,991,280 | A | * | 2/1935 | Hynes | 392/349 |
| 6,155,440 | A | * | 12/2000 | Arce | 211/118 |

* cited by examiner

*Primary Examiner* — Steven B McAllister
*Assistant Examiner* — John Bargero
(74) *Attorney, Agent, or Firm* — Michael Best & Friedrich LLP; Jeroen Valensa; Michael Bergnach

(57) ABSTRACT

A system for mounting a heater to structural members having a predetermined spacing includes a first mounting bracket having first and second mounting locations. The first and second mounting locations are spaced apart by a first integer multiple of the predetermined spacing. The system also includes a second mounting bracket having third and fourth mounting locations. The third and fourth mounting locations re spaced apart by the first integer multiple of the predetermined spacing. The system further includes a plurality of attachment points on the heater for attaching the first and second mounting brackets to the heater. The plurality of attachment points is arranged to locate the first, second, third, and fourth mounting locations in a mounting plane, with both the first and the third mounting locations and the second and the fourth mounting locations being spaced apart by a second integer multiple of the predetermined spacing.

19 Claims, 6 Drawing Sheets

HEATER MOUNTING SYSTEM

CROSS-REFERENCE TO RELATED APPLICATIONS

This application claims priority to U.S. Provisional Patent Application No. 61/476,636, filed Apr. 18, 2011, the entire contents of which are hereby incorporated by reference.

BACKGROUND

Self-contained unit heaters to provide comfort heating of enclosed spaces are well known. Such heaters typically operate by circulating a portion of the air contained within the enclosed space through the heater, and adding heat energy to the air as it passes through the heater enclosure. The heat energy can be obtained by a variety of commonly known methods, including direct-fired, indirect-fired, hydronic, and electric resistance.

In order to efficiently heat the space, as well as to provide minimal obstruction, it is common practice to mount heaters of this type to a ceiling of the enclosed space. Due to the inherent weight of such heaters, the heaters are typically secured to structural members of the ceiling. This can be problematic for several reasons. As one example of such reasons, the arrangement of the structural members of the ceiling may preclude an optimal and/or desirable mounting location, orientation, or both. As another example, the mounting may require substantial spacing between the heater and the ceiling, thereby undesirably limiting the available head-room in the vicinity of the heater.

SUMMARY

A mounting system for mounting a heater to structural members provides increased head room and flexibility of mounting. The mounting system provides mounting locations that can be located directly beneath structural members having a regular spacing, with at least two different mounting orientations. Removable brackets allow for the heater to be mounted entirely below the structural members, or with a first portion of the heater located between the structural members and a second portion located below the structural members. An air inlet can be provided in the first portion, and an air outlet can be provided in the second portion.

According to an embodiment of the invention, a system is provided for mounting a heater to structural members having a predetermined spacing. The system includes a first mounting bracket having first and second mounting locations, and a second mounting bracket having third and fourth mounting locations. The first and second mounting locations are spaced apart from one another by an integer multiple of the predetermined spacing. The third and fourth mounting locations are also spaced apart from one another by the same amount.

The heater has attachment points for attaching the first and second mounting brackets to the heater. The attachment points are arranged to locate the first, second, third and fourth mounting locations in a mounting plane, and to provide a spacing between both the first and the third mounting locations, and between the second and fourth mounting location, that is another integer multiple of the predetermined spacing.

In some embodiments, the heater has additional attachment points for attaching the first and second mounting brackets to the heater. Those attachment points are arranged to locate the first, second, third and fourth mounting locations in another mounting plane.

According to some embodiments, an air inlet direction and an air outlet direction of the heater are oriented parallel with a mounting plane. In some embodiments, the air inlet direction is parallel with a mounting plane and the air outlet direction is perpendicular to the mounting plane.

In some embodiments, the entire heater is located on one side of a mounting plane. In some embodiments, one portion of the heater is located on one side of a mounting plane and another portion of the heater is located on the other side of the mounting plane.

According to another embodiment of the invention, a system is provided for mounting a heater in two different configurations. The system includes a first and second bracket with mounting locations. In the first configuration, the brackets are attached so that the mounting locations are arranged in a first mounting plane, and the entire heater is located on one side of the first mounting plane. In the second configuration, the brackets are attached so that the mounting locations are arranged in a second mounting plane, a first portion of the heater is located on one side of the second mounting plane, and a second portion of the heater is located on the other side of the second mounting plane.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
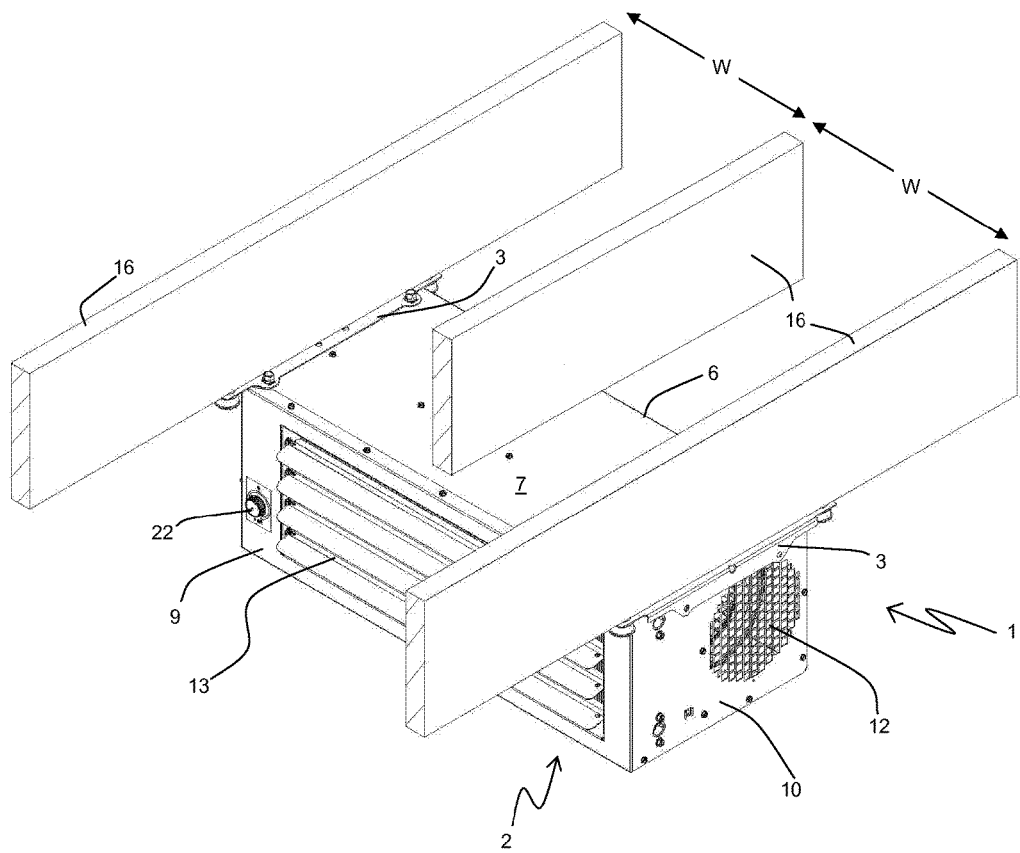
FIG. 1 is a perspective view of a mounted heater using a mounting system according to some embodiments of the invention.

FIG. 1 illustrates a mounting system 1 for mounting a heater 2 according to an embodiment of the invention. The mounting system 1 includes a pair of brackets 3 that are removably attached to an enclosure 6 of the heater 2, and securely fasten the heater 2 to structural members 16. The mounting system 1 can be used to support the heater 2 within a room or other enclosed space in order to provide comfort heating of the space.

Figure 2:
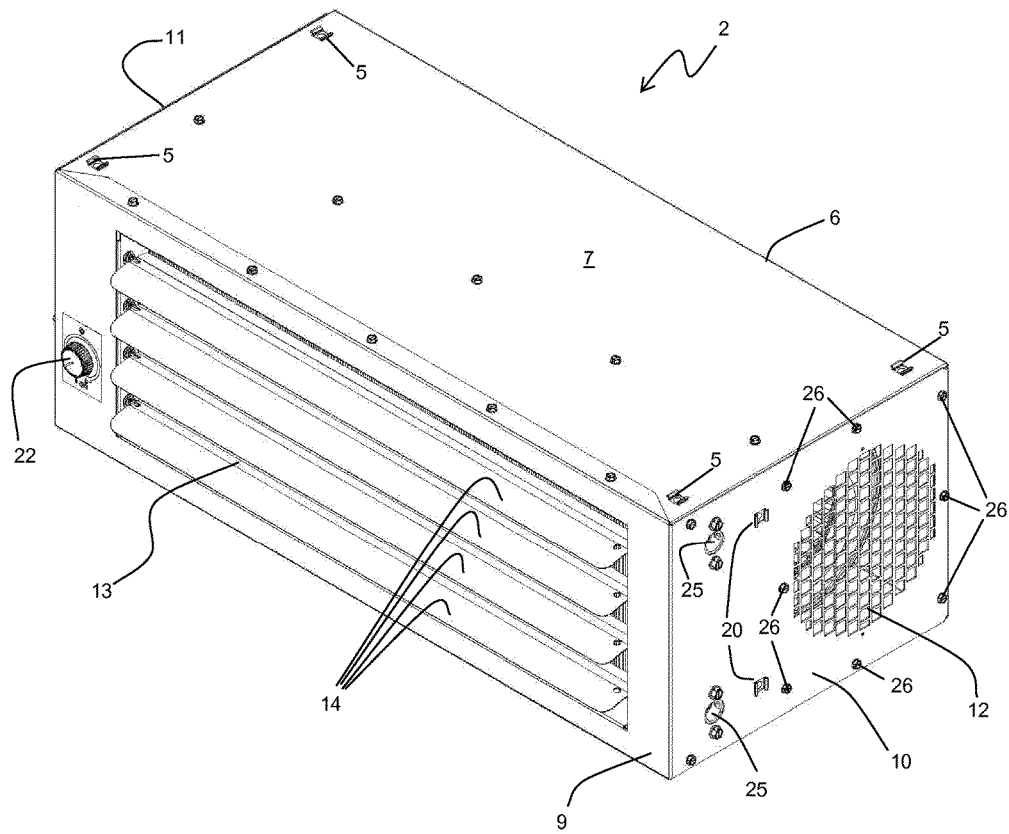
FIG. 2 is a perspective view of the heater of FIG. 1.

The heater 2 can include various types of operating components therein to accomplish the comfort heating. For example, the heater 2 can include one or more blowers, fans, or other types of air-moving devices. In the embodiment of FIG. 2, the heater 2 includes a hydronic heating coil as a heat source. The hydronic heating coil can be operatively connected to a hydronic heating circuit by way of fluid connection ports 25 located on the surface 10 of the heater 2. However, it should be understood that the heater 2 can include various types of heat sources, including but not limited to hydronic heating coils, heat pump refrigerant coils, electric resistance heating elements, and combustion exhaust heat exchangers.

The structural members 16 can be framing members that form a portion of the physical structure defining the enclosed space. As an example, the structural members 16 can be floor joists for a floor located above the enclosed space. As another example, the structural members 16 can be rafters or trusses for a roof enclosing the space.

In residential and commercial construction, as a result of both building codes and construction trade best practices, structural members of a building such as the joists, rafters and trusses described above typically have consistent and regular sizes. For example, so-called dimensional lumber having a general thickness of 1.5 inches has long been an industry standard in the United States for such applications. In some cases, light-gauge steel has become an alternative material to dimensional lumber, but typically the steel is formed to have a shape with approximately similar dimensions to the dimensional lumber that it replaces.

The aforementioned structural members are also typically installed with a consistent and regular spacing in order to adequately support structural loads. A center-to-center spacing of sixteen inches between adjacent structural members has become an almost ubiquitous standard, although several other standards (for example, twenty-four inches) can also be found for certain types of structures. The mounting system 1 can be specifically optimized to take advantage of such a standardized spacing.

In the embodiments of FIGS. 1-6, the mounting system 1 is designed for use with structural members 16 having a predetermined center-to-center spacing W. In some embodiments, the predetermined spacing W is approximately sixteen inches, while in other alternative embodiments, the predetermined spacing W is approximately twenty-four inches, or some other dimension as may be expected to be found between structural members 16.

As shown in FIG. 2, the heater 2 is provided with attachment points 5 for attachment of the brackets 3. Although the attachment points 5 are all shown located on a common surface 7 of the heater 2 in the illustrated embodiment, in other embodiments, some or all of the attachment points 5 can be located on other surfaces of the heater 2. The attachment points 5 can comprise threaded holes in the enclosure 6, threaded fasteners that are captively embedded into the enclosure 6, or other similar mechanical fasteners. In some embodiments, the attachment points 5 comprise unthreaded holes sized to receive sheet-metal screws.

In some embodiments, duplicate sets of attachment points 5 can be provided on opposing surfaces of the heater 2 (for example, on the surface 7 and on the surface directly opposite the surface 7). By providing such duplicate sets of attachment points 5, additional mounting flexibility can be provided. This flexibility can be especially useful when, for example, connection of the hydronic heating circuit to the fluid connection ports 25 is only achievable in specific orientations.

Figure 3:
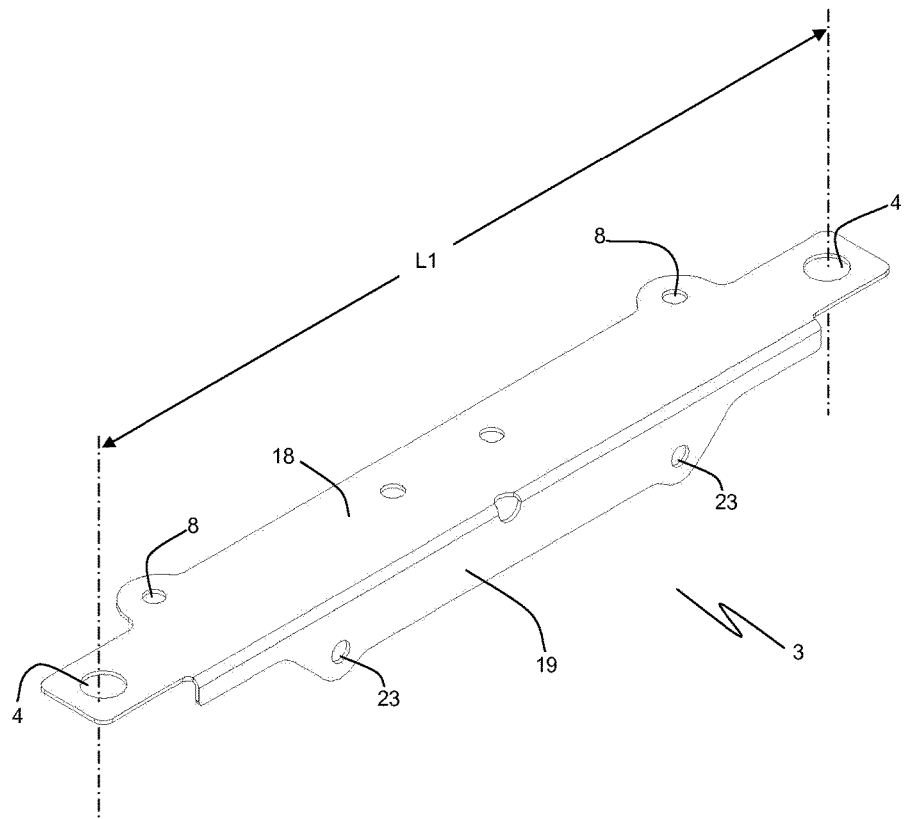
FIG. 3 is a perspective view of a portion of the mounting system of FIG. 1.

As shown in FIG. 3, the brackets 3 are provided with attachment holes 8 that correspond to the attachment points 5. The brackets 3 can be attached to the heater 2 by inserting mechanical fasteners 24 (FIG. 4) through the attachment holes 8 of the brackets 3 into the attachment points 5 of the heater 2 in order to securely fasten the brackets 3 to the heater 2. The mechanical fasteners 24 can be bolts, screws, or other types of fasteners compatible with the attachment points 5.

The brackets 3 include two mounting locations 4 spaced a distance L1 apart from one another. The distance L1 is preferably an integer multiple of the predetermined spacing W of the structural members 16. By way of example, the distance L1 can be equal to the distance W, or it can be twice, three times, or some integer greater than three times the distance W.

Figure 4:
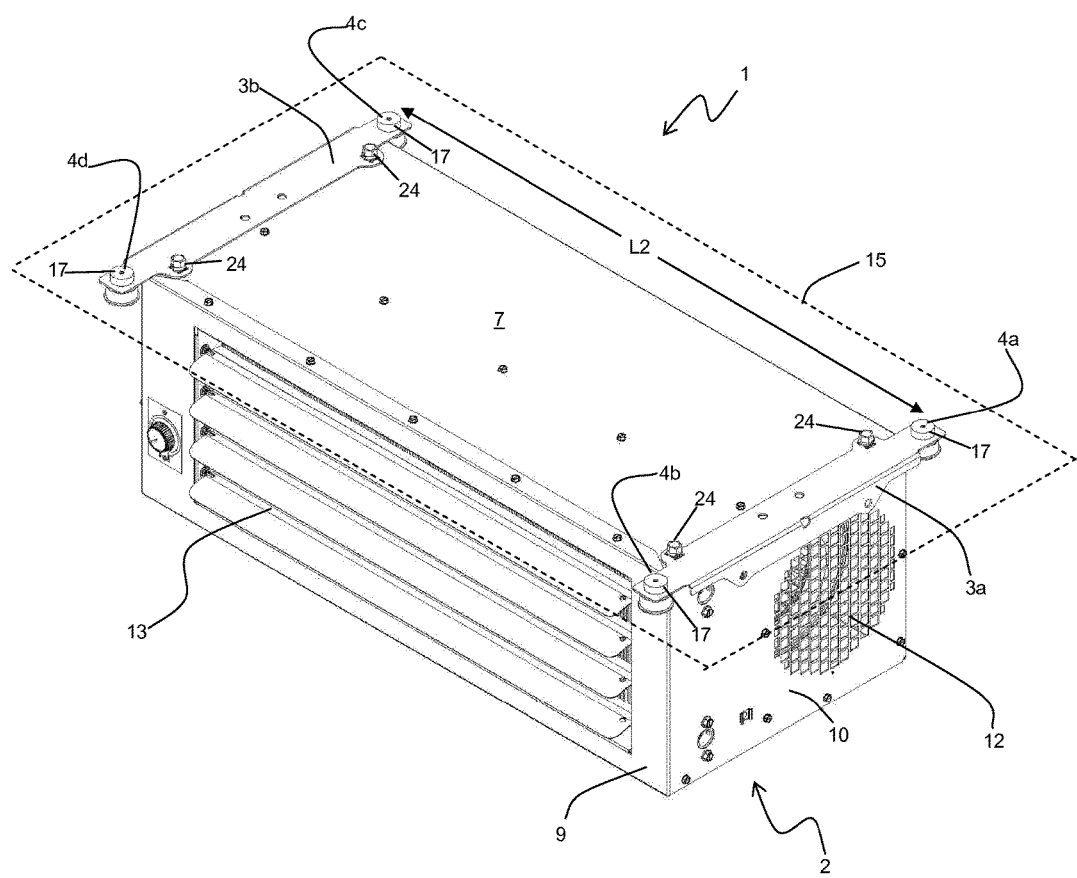
FIG. 4 is a perspective view of the heater and the mounting system as used in FIG. 1.

As shown in FIG. 4, when the brackets 3 are attached to the heater 2 by way of the attachment points 5, the four mounting locations 4 (i.e., 4a, 4b, 4c, 4d) provided by the two brackets 3 are located in a common mounting plane 15. The distance between the mounting location 4a of one bracket 3a and the mounting location 4c of another bracket 3b is a distance L2. Likewise, the distance between the mounting location 4b of the one bracket 3a and the mounting location 4d of the other bracket 3b is the distance L2. In the embodiment of FIG. 1, the distance L2 is equal to two times the predetermined spacing W of the structural members 16. In other embodiments, the distance L2 can be a different integer multiple of the predetermined spacing W.

Having both the distance L1 and the distance L2 be integer multiples of the predetermined spacing W can provide certain advantages in mounting of the heater 2. All four mounting locations 4 can be located directly underneath the structural members 16 (FIG. 1) when the heater 2 is oriented with either the distance L1 aligned along the span-wise direction of the structural members 16, or with the distance L2 aligned along the span-wise direction, thereby providing greatly improved flexibility and ease of mounting. The heater 2 can furthermore be mounted with the mounting plane 15 in close proximity to the ceiling, thereby maximizing the available headroom.

The heater 2 can be mounted to the structural members 16 by driving mechanical fasteners such as screws, lag bolts, or the like (not shown) through the mounting locations 4. Optionally, isolators 17 can be provided in order to prevent the transmission of undesirable vibrations between the heater 2 and the structural members 16.

In order to provide the requisite air flow through the heater 2, the heater 2 includes one or more air inlets 12 and one or more air outlets 13. The air inlets 12 and the air outlets 13 can each be positioned on one or more surfaces of the heater enclosure 6. In the illustrated embodiment, a single air outlet 13 is provided on a surface 9 of the enclosure 6, and an air inlet 12 is provided on a surface 10 of the enclosure 6. An additional air inlet can optionally be provided on the surface 11 located opposite the surface 10, in order to provide both balanced flow and additional flow area for the air entering the heater 2. Referring back to FIG. 2, the heater 2 is additionally provided with a plurality of fastening locations 26 arranged around the outer perimeter of the air inlet 12. These fastening locations 26 can be used to connect additional ductwork directly to the enclosure 6 in order to convey the air to the inlet 12.

With the heater 2 mounted as shown in FIG. 1, the air inlets 12 and the air outlets 13 are oriented such that the air flow directions both into and out of the heater 2 (i.e., the directions perpendicular to and of the surfaces 9, 10, 11 providing the air inlet 12 and the air outlet 13) are parallel to the mounting plane 15. Louvers 14 (FIG. 2) can be provided, as shown, at the air outlet 13 in order to allow for adjustment in the direction of the heated air flow once it exits the air outlet 13. In some embodiments, the louvers 14 can be removable and/or reversible, so that proper adjustment of air flow direction can still be maintained in cases where the heater 2 is mounted in an inverted orientation from that shown in FIG. 1.

Controls 22 can also be optionally provided on the air outlet surface 9. Although such controls can be located anywhere on the heater 2, the air outlet surface 9 provides certain advantages in that ready access to the surface 9 would ordinarily be maintained so that the air flow passing through the air outlet 13 is not obstructed. However, it should be understood that in some embodiments the controls 22 need not be located on the heater 2 at all.

Figure 5:
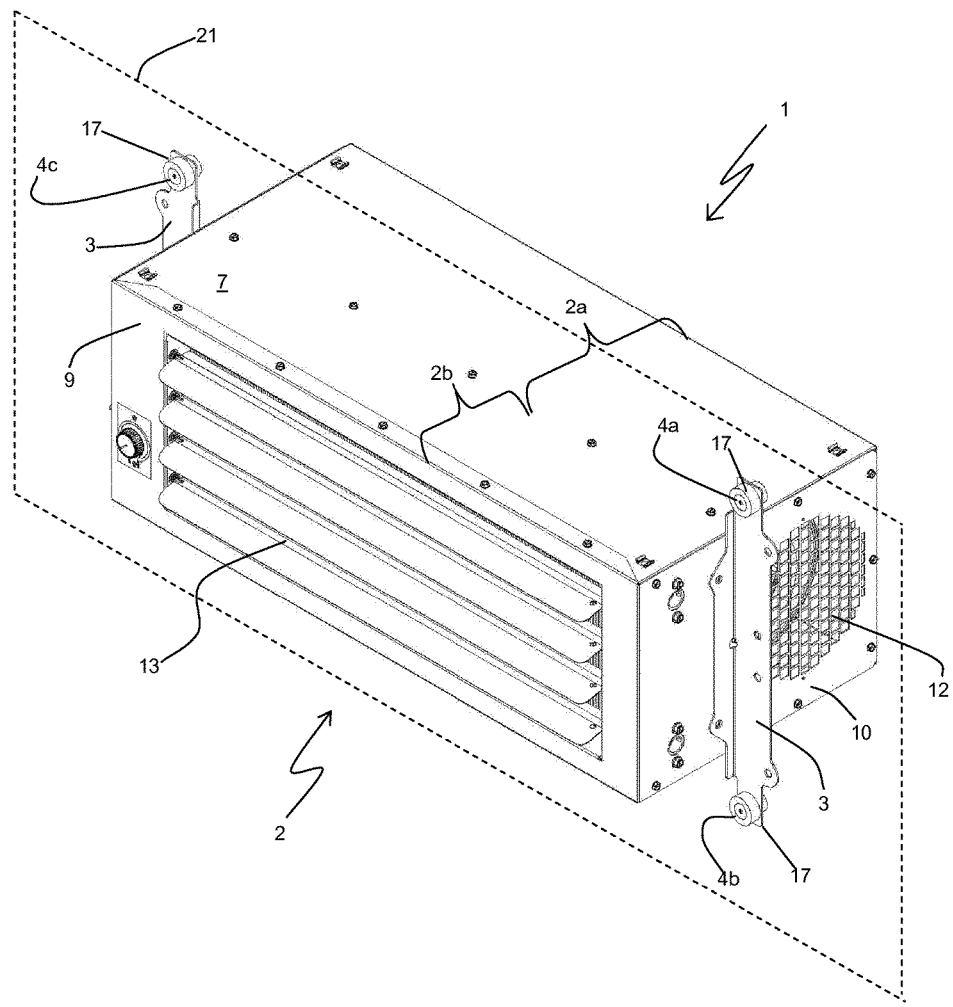
FIG. 5 is a perspective view of an alternative arrangement of the heater and the mounting system of FIG. 4, according to some embodiments of the invention.
Figure 6:
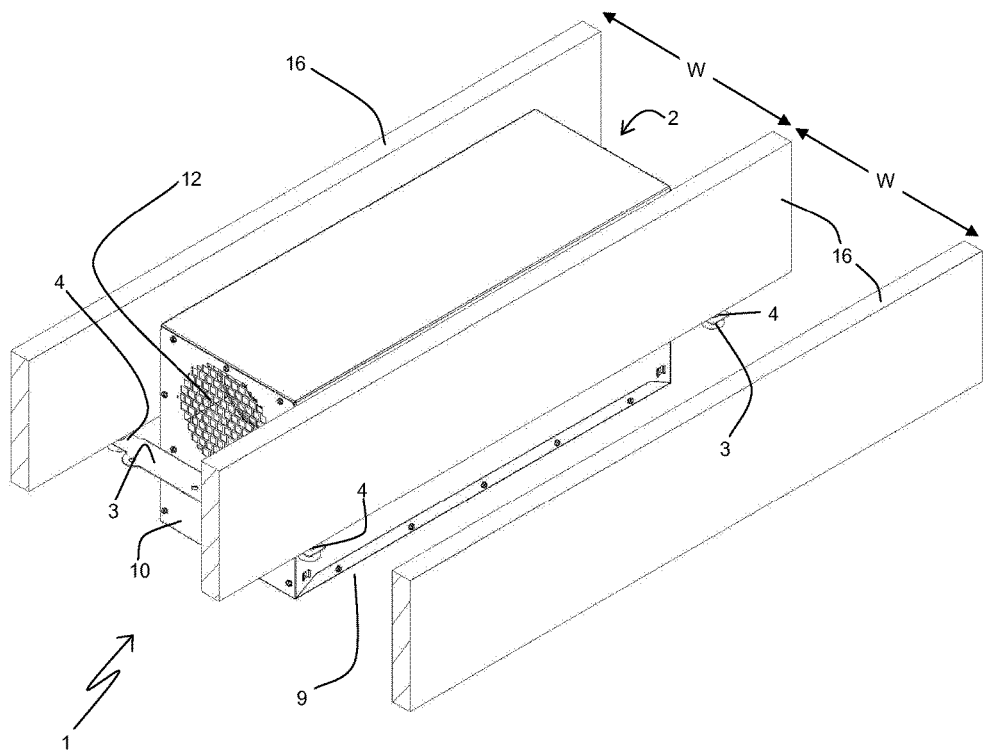
FIG. 6 is a perspective view of the mounted heater using the arrangement of FIG. 5.

In FIGS. 5 and 6 the heater 2 is shown with the brackets 3 attached in an alternative manner in order to provide another mounting configuration. In this configuration, the brackets 3 are attached to a second set of attachment points 20 (FIG. 2) located on the surfaces 10, 11 of the enclosure 6. Corresponding attachment holes 23 (FIG. 3) are provided in the brackets 3 in order to allow for the attachment of the brackets 3 in a manner similar to those described earlier with respect to the attachment features 5, 8. As shown in FIG. 3, to provide for the different mounting configurations, the bracket 3 includes a first planar bracket section 18 (having the set of attachment holes 8 and the mounting locations 4 provided therein) and a second planar bracket section 19 (having the set of attachment holes 23 provided therein) oriented at a 90° angle relative to the first planar bracket section 18.

By attaching the brackets 3 to the heater 2 in the alternative manner of FIGS. 5 and 6, the mounting locations 4 are arranged in a second mounting plane 21. Relative to the surfaces of the heater enclosure 6, the mounting plane 21 is perpendicular to the mounting plane 15. In other words, those surfaces of the enclosure 6 that are parallel to the mounting plane 15 when the brackets 3 are attached to the first set of attachment points 5 are perpendicular to the mounting plane 21 when the brackets 3 are attached to the second set of attachment points 20, and those surfaces of the enclosure 6 that are parallel to the mounting plane 21 when the brackets 3 are attached to the second set of attachment points 20 are perpendicular to the mounting plane 15 when the brackets 3 are attached to the first set of attachment points 5.

The mounting plane 21 extends through the heater 2 so that a first portion 2a of the heater 2 is located on one side of the mounting plane 21 and a second portion 2b of the heater 2 is located on the other side of the mounting plane 21. The air inlet 12 is located in the first portion 2a, and the air outlet 13 is located in the second portion 2b. The air inlet direction is parallel to the mounting plane 21 in this configuration, and the air outlet direction is perpendicular to the mounting plane 21.

Since the distance L1 is equal to the predetermined spacing W, the heater 2 can be mounted by fasteners extending through the mounting locations 4a and 4c into one of the structural members 16, and through the mounting locations 4b and 4d into an adjacent one of the structural members 16. The heater portion 2a can thus be located between the structural members 16, and the air inlet direction can be aligned with the span-wise direction of the structural members 16 so that the space between the structural members 16 can function as an inlet plenum for the air passing through the heater 2 when the space between the structural members 16 is closed off.

By locating the first heater portion 2a between the structural members, only the second portion 2b is exposed into the space to be heated. Mounting the heater 2 in this manner can provide substantially increased headroom below the heater 2 in comparison to installations where a heater is located entirely below the structural members 16. Since the air outlet surface 9 is oriented parallel to the mounting plane 21, the distance by which the heater portion 2b extends below the mounting plane 21 is limited only by the available room between the structural members 16 to accommodate the heater portion 2a.

It may be preferable, in some cases, for the heater 2 to be mounted so that the heater portion 2b is located in the space between the structural members 16 instead of the heater portion 2a. This type of mounting can provide heated air to be directed up through the floor of a space located above the structural members 16.

In some embodiments the set of attachment points 20 and corresponding attachment holes 23 can be arranged so that the brackets 3 can be attached by the attachment points 20 in two different orientations. In the first orientation, the brackets 3 are attached so that the bracket planar sections 18 are located nearest to the air outlet surface 9, thereby minimizing the heater portion 2b and maximizing the heater portion 2a. In the second orientation (shown in FIGS. 5 and 6), the brackets 3 are rotated 180° in the plane of the bracket planar section 19, so that the bracket planar sections 18 are located furthest from the air outlet surface 9. This orientation can be desirable in installations where the available space between the structural members 16 is reduced. By way of example, in the first orientation the heater portion 2a can be appropriately sized for use with structural members constructed of 2×12 nominal dimension lumber, whereas in the second orientation the heater portion 2a can be appropriately sized for use with structural members constructed of 2×10 nominal dimension lumber. In still other embodiments, the heater 2 can be provided with multiple sets of attachment points 20 in order to allow for variable placement of the brackets 3 along the surfaces 10, 11.

The attachment holes 23 can also find utility as additional mounting locations when the brackets 3 are attached to the heater 2 by way of the attachment points 5. By inverting the brackets 3 from the orientation shown in FIG. 4 (i.e., so that the planar sections 19 of the brackets 3 are located on the opposite side of the mounting plane 15 from the heater 2), fasteners can be inserted through the attachment holes 23 into the sides of the structural members 16 in order to provide additional support for the heater 2.

The brackets 3 can be advantageously provided as two identical and interchangeable parts (e.g., of a common design), thereby minimizing the number of unique parts required and providing for simplified installation. The brackets 3 are, however, not required to be identical or interchangeable.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

Various features and advantages of the invention are set forth in the following claims.

What is claimed is:

1. A heater and mount system configured to mount to structural members having a predetermined spacing, the system comprising:
   a first mounting bracket having first and second mounting locations, the first and second mounting locations being spaced apart by a first integer multiple of the predetermined spacing;
   a second mounting bracket having third and fourth mounting locations, the third and fourth mounting locations being spaced apart by the first integer multiple of the predetermined spacing; and
   a heater including a plurality of attachment points to attach the first and second mounting brackets to the heater, the plurality of attachment points arranged to locate the first, second, third, and fourth mounting locations in a mounting plane and such that the first and the third mounting locations are spaced apart by a second integer multiple of the predetermined spacing and the second and the fourth mounting locations are spaced apart by the second integer multiple of the predetermined spacing.

2. The system of claim 1, wherein the first and second mounting brackets are substantially identical such that the first and the second mounting brackets are interchangeable.

3. The system of claim 1, wherein the first integer multiple of the predetermined spacing is equal to the predetermined spacing.

4. The system of claim 1, wherein the second integer multiple of the predetermined spacing is equal to two times the predetermined spacing.

5. The system of claim 1, wherein the heater is entirely located on one side of the mounting plane when the first and second brackets are attached to the heater by the plurality of attachment points.

6. The system of claim 1, wherein the heater includes:
   an air inlet face defining an air inlet direction; and
   an air outlet face defining an air outlet direction;
   wherein the air inlet direction and the air outlet direction are generally parallel to the mounting plane.

7. The system of claim 1, wherein the predetermined spacing is approximately sixteen inches.

8. The system of claim 1, wherein the plurality of attachment points is a first plurality of attachment points and the mounting plane is a first mounting plane, and wherein the heater further includes a second plurality of attachment points to attach the first and second mounting brackets to the heater, the second plurality of attachment points arranged to locate the first, second, third, and fourth mounting locations in a second mounting plane oriented approximately perpendicular to the first mounting plane with respect to the heater.

9. The system of claim 8, wherein a first portion of the heater is located on a first side of the second mounting plane and a second portion of the heater is located on a second side of the second mounting plane opposite the first side when the first and second mounting brackets are attached to the heater by the second plurality of attachment points.

10. The system of claim 8, wherein the heater includes:
    an air inlet defining an air inlet direction; and
    an air outlet defining an air outlet direction;
    wherein the air inlet direction is parallel to the second mounting plane and the air outlet direction is perpendicular to the second mounting plane when the first and second mounting brackets are attached to the heater by the second plurality of attachment points.

11. The system of claim 10, wherein the air inlet direction and the air outlet direction are parallel to the first mounting plane when the first and second mounting brackets are attached to the heater by the first plurality of attachment points.

12. The system of claim 10, wherein the air inlet is located on the first portion of the heater and the air outlet is located on the second portion of the heater.

13. A heater and mount system configured to mount to structural members, the system comprising:
    a first mounting bracket having first and second mounting locations;
    a second mounting bracket having third and fourth mounting locations, wherein a spacing between the first and second mounting locations and a spacing between the third and fourth mounting locations are both equal to a predetermined spacing of the structural members; and
    a heater including,
       a first plurality of attachment points to attach the first and second mounting brackets to the heater in a first configuration to locate the first, second, third, and fourth mounting locations in a first mounting plane, and
       a second plurality of attachment points to attach the first and second mounting brackets to the heater in a second configuration to locate the first, second, third, and fourth mounting locations in a second mounting plane,
    wherein the heater is entirely located on one side of the first mounting plane when the first and second mounting brackets are attached in the first configuration, and
    wherein a first portion of the heater is located on a first side of the second mounting plane and a second portion of the heater is located on a second side of the second mounting plane when the first and second mounting brackets are attached in the second configuration.

14. The system of claim 13, wherein the first and second mounting brackets are substantially identical such that the first and the second mounting brackets are interchangeable.

15. The system of claim 13, wherein the heater includes:
    an air inlet defining an air inlet direction; and
    an air outlet defining an air outlet direction;
    wherein the first mounting plane is generally parallel to the air inlet direction and the air outlet direction in the first configuration, and wherein the second mounting plane is generally parallel to the air inlet direction and generally perpendicular to the air outlet direction in the second configuration.

16. The system of claim 15, wherein the air inlet is located in one of the first and second portions of the heater and the air outlet is located in the other of the first and second portions of the heater in the second configuration.

17. A user-configurable system for mounting a heater to structural members, the system comprising:
    support means for supporting the heater from the structural members, the support means includes at least two mounting holes spaced apart by a distance equal to a predetermined spacing between the structural members;

first attachment means for attaching the support means to the heater in a first user-selectable configuration; and second attachment means for attaching the support means to the heater in a second user-selectable configuration, wherein the heater is located entirely below the structural members in the first configuration, and wherein the heater is located partially below and partially between the structural members in the second configuration.

18. The system of claim 17, wherein an air inlet of the heater is located between the structural members and an air outlet of the heater is located below the structural members in the second configuration.

19. The system of claim 17, wherein an air inlet of the heater is located below the structural members and an air outlet of the heater is located between the structural members in the second configuration.

* * * * *